United States Patent [19]

Yamada et al.

[11] Patent Number: 5,543,855
[45] Date of Patent: Aug. 6, 1996

[54] IMAGE PROCESSING METHOD AND APPARATUS WITH ERROR DIFFUSION

[75] Inventors: Osamu Yamada, Yokohama; Susumu Sugiura, Atsugi; Takeshi Makita, Yokohama, all of Japan

[73] Assignee: Canon Kabushiki Kaisha, Tokyo, Japan

[21] Appl. No.: 246,720

[22] Filed: May 20, 1994

[30] Foreign Application Priority Data

May 24, 1993 [JP] Japan ................................. 5-121210

[51] Int. Cl.$^6$ .................................................. H04N 5/14
[52] U.S. Cl. ............................ 348/753; 348/752; 358/445
[58] Field of Search ..................................... 358/443, 445, 358/455, 456; 348/254, 441, 453, 572, 573, 574, 671

[56] References Cited

U.S. PATENT DOCUMENTS

5,130,819  6/1992  Ohta ......................................... 345/445

*Primary Examiner*—Victor R. Kostak
*Assistant Examiner*—Nathan J. Flynn
*Attorney, Agent, or Firm*—Fitzpatrick, Cella, Harper & Scinto

[57]  ABSTRACT

An image processing apparatus which enables error diffusion in interlaced-scanning image data. An input unit inputs image data formed by interlaced-scanning, and an adder adds error data to the input data. A binarization circuit performs level-conversion on this data. An error calculator obtains a quantization error as error data to be diffused to other pixels. The error data is stored in first and second lines in a line buffer. When processing for one scanning line is finished, error data for the next scanning line is read out of a frame buffer and stored into the first line in the line buffer, and the error data stored in the second line in the line buffer is stored at a corresponding position in the frame buffer, then the second line is cleared.

18 Claims, 6 Drawing Sheets

IMAGE PROCESSING METHOD AND APPARATUS WITH ERROR DIFFUSION

BACKGROUND OF THE INVENTION

Present invention relates to an image processing method and apparatus which performs quantization for pseudo-halftone outputting.

Generally, the average error minimization method, which is substantially the same as the error diffusion method, is known as one of the density-conservation type binarization methods. The error diffusion method executes level conversion by diffusing errors generated during level conversion to peripheral pixels of a pixel of interest.

On the other hand, in TV image reception, interlaced scanning is used, as an image output method, to reduce flicker in an image using a CRT and to narrow transmission band. The interlaced scanning forms one image frame with two separate transmission fields, i.e., an odd-numbered field (referred to as "D1 field") and an even-numbered line field (referred to as "D2 field") to be interposed at the receiver. The D1 and D2 fields are transmitted and displayed consecutively, thus completing a picture for one frame.

The interlaced scanning is applicable to a display which basically performs binary representation. However, problems occur when the error diffusion method is used to attain pseudo-halftone image output.

The error diffusion method conserves density by diffusing a conversion error to peripheral pixels adjacent to the pixel of interest. If this conventional error diffusion is applied to the interlaced scanning which interlaces two image data each having alternate lines, error diffusion cannot work between the separated D1 and D2 fields. This results in failure of density conservation, thus degrading image quality.

SUMMARY OF THE INVENTION

The present invention has been made in consideration of the above situation, and has as its object to provide an image processing method and apparatus which enables level conversion in a pseudo-halftone representation to image input at intervals of a predetermined number of lines.

Another object of the present invention is to provide an image processing method and apparatus which enables error diffusion between-interlaced-scanning fields and enables density-conserving level conversion with high image quality.

A further object of the present invention is to provide an image processing method and apparatus which binarizes image data while maintaining image data characteristics (density) between transmission fields.

According to the present invention, the foregoing objects are attained by providing an image processing apparatus comprising: input means for inputting pixel data of an image composed of a plurality of fields; conversion means for converting the pixel data inputted by the input means to a predetermined tone-level data, based on the pixel data and a diffusion error assigned to the pixel data, and outputting the converted data; diffusion means for diffusing an error generated in conversion by the conversion means and assigning the diffused errors as conversion errors to other pixel data; storage means for storing a conversion error assigned to pixel data in another one of the fields, out of conversion errors obtained by the diffusion means; and generation means for generating a diffusion error based on the conversion error obtained by the diffusion means and the conversion error stored by the storage means upon level conversion in the other one of the fields.

The above construction obtains a conversion error to be diffused to other pixels based on an error occurring in level conversion of a transmission field, upon level conversion of image data having a plurality of transmission fields. Among conversion errors, an error to be diffused to the pixels in another field is stored. The diffusion errors are generated based on the difference between the conversion error occurring in the level conversion of the object field and the conversion error, stored in level conversion of another field, to be diffused to pixels of the object filed. The level conversion is performed in accordance with the resulting diffusion errors and pixel data of the object pixel of the level conversion.

As the conversion error is diffused to pixels in another field, level conversion using a pseudo-halftone representation can be applied to image input by interlaced scanning.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT(S)

Preferred embodiments of the present invention will be described in detail in accordance with the accompanying drawings.

Figure 1:
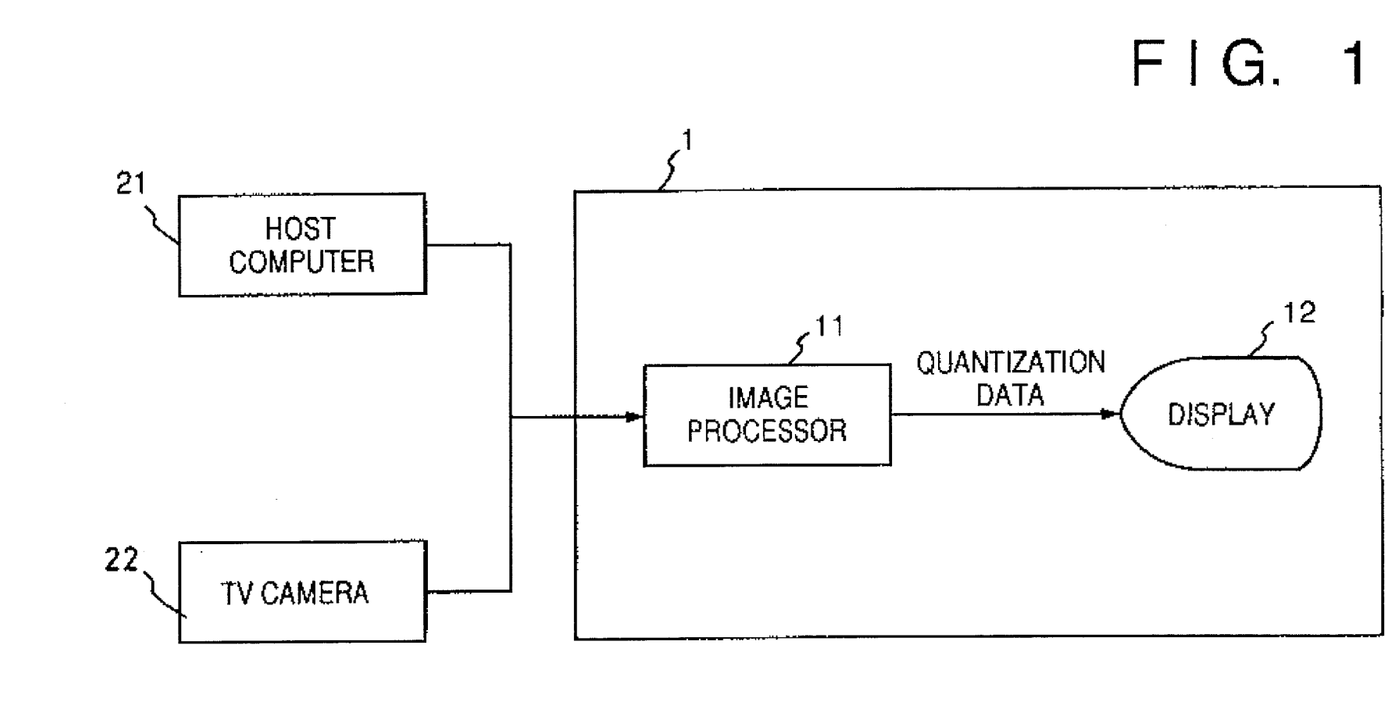
FIG. 1 is a block diagram showing the configuration of an image forming apparatus according to an embodiment of the present invention.

FIG. 1 shows the configuration of the image forming apparatus according to the embodiment of the present invention. In FIG. 1, reference numeral 1 denotes an image forming apparatus main body which performs quantization on image data inputted from an external device and displays a visible image. The input image data is an analog video signal inputted in the form of interlaced scanning. Numeral 11 denotes an image processor which quantizes the input image data to binary data. It should be noted that quantization data is outputted from the image processor 11 in accordance with the interlaced-scanning order. Numeral 12 denotes a display which displays the quantization data from the image processor 11. The display 12 comprises, e.g., a ferroelectric-type liquid crystal display (FLCD) to perform binary display with respect to each pixel. Further, the display 12 displays a moving image by interlaced scanning.

Numeral 21 denotes a host computer, and 22, a TV camera, both connected to the image forming apparatus as external devices. In the present embodiment, these eternal devices output analog RGB image data in the form of interlaced-scanning to the image forming apparatus 1. The analog RGB data is an image signal outputted as an analog signal for each color component.

Next, the construction of the image processor 11 will be described with reference to the block diagram of FIG. 2.

Figure 2:
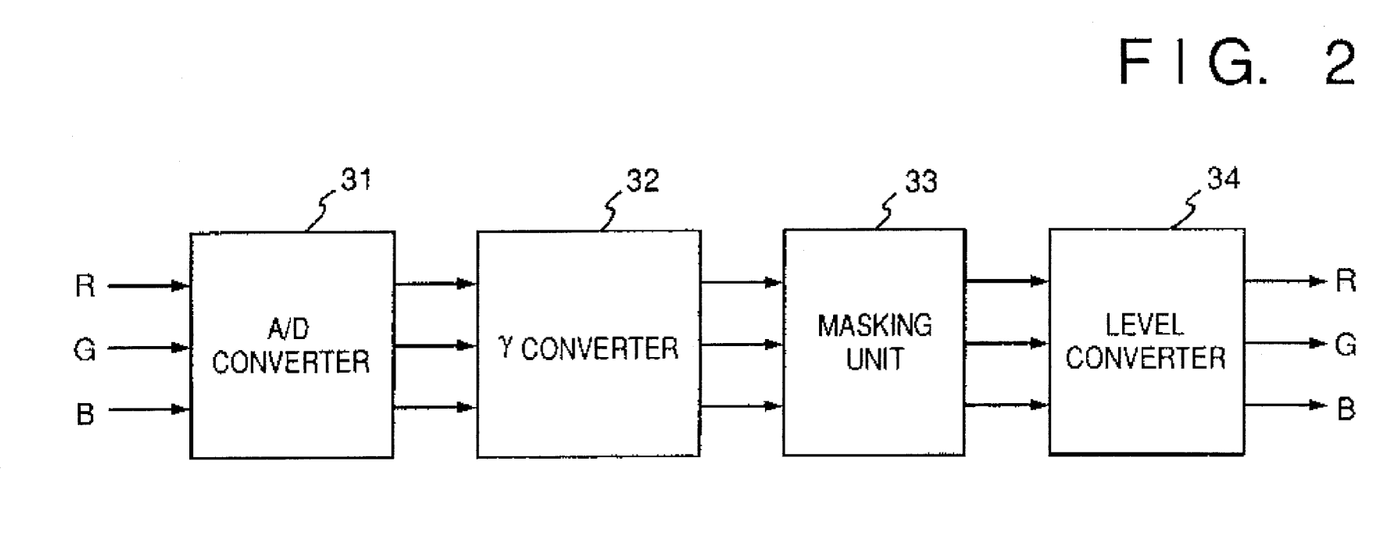
FIG. 2 is a block diagram showing the construction of an image processor in the embodiment.

In FIG. 2, numeral 31 denotes an A/D converter which converts the analog RGB data inputted from the external device into eight-bit digital RGB data, as a result, obtains two-hundred and fifty-six (256) level digital RGB data. Numeral 32 denotes a γ-converter which performs γ-correction on the digital RGB data; 33, a masking unit which performs color correction on the γ-corrected digital RGB data; 34, a level converter which performs level conversion on the digital RGB data. In the present embodiment, the level converter 34 converts the input two-hundred and fifty-six level digital RGB data into binary RGB data.

When analog RGB data enters the image processor 11, the A/D converter 31 converts the data into eight-bit digital RGB data. Next, the γ-converter 32 corrects the γ-characteristic of the data so that it corresponds to the γ-characteristic of an output device. For example, in a case where RGB data having a 0.45 gamma characteristic from the television camera 23 is desired to be given a linear gamma characteristic, a gamma correction of 2.2 is applied to the input color signal.

Next, the masking unit 33 performs color correction on the digital RGB data, in accordance with the following 3×3 first-order conversion:

$$R=m_{11} \times R+m_{12} \times G+m_{13} \times B$$

$$G=m_{21} \times R+m_{22} \times G+m_{23} \times B$$

$$B=m_{31} \times R+m_{32} \times G+m_{33} \times B$$

Finally, the level converter 34 converts the RGB data, in which each color component has eight bits, into RGB data in with each color component has one bit. Note that the quantization maintains pseudo half-tone representation of the image.

Figure 3:
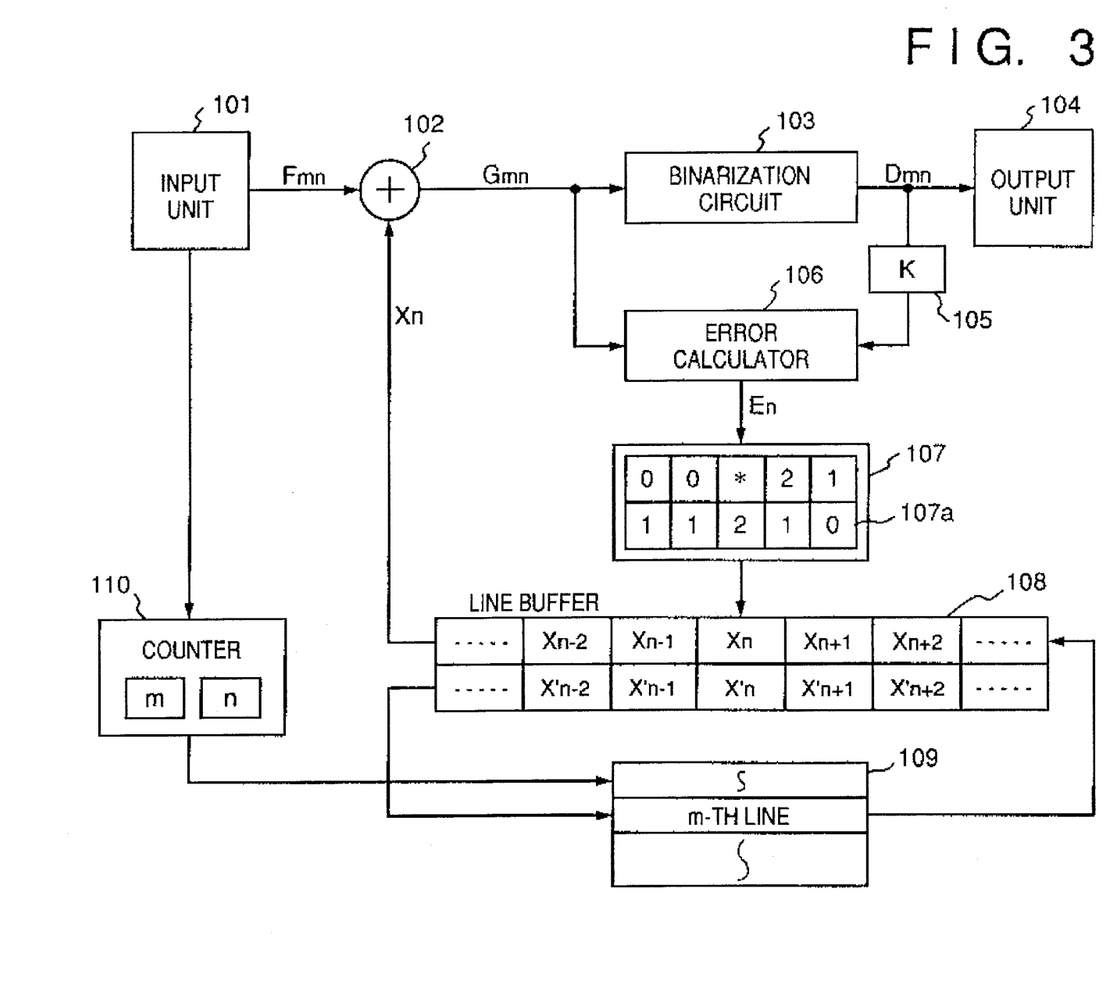
FIG. 3 is a block diagram showing the construction of a level converter in the embodiment.

FIG. 3 shows the construction of the level converter 34. In FIG. 3, numeral 101 denotes an input unit which inputs the digital RGB data from the masking unit 33 and outputs the data, as data $F_{mn}$, to an adder 102, by color component. Note that the data $F_{mn}$ indicates density of a color pixel having coordinates (m, n).

The adder 102 adds the data $F_{mn}$ outputted from the input unit 101 to an accumulation error $X_n$ obtained from a line buffer 108. The accumulation error $X_n$ indicates the accumulation error in the coordinates (m, n). The adder 102 outputs the addition result as data $G_{mn}$ (=$F_{mn} +_n$) to a binarization circuit 103. The binarization circuit 103 compares the value $G_{mn}$ with a threshold level $V_{th}$. If $G_{mn} \geq V_{th}$, the binarization circuit 103 outputs pixel data $D_{mn}$ having a value "1", while if $G_{mn} < V_{th}$, the circuit 103 outputs data $D_{mn}$ having a value "0". Numeral 104 denotes an output unit which performs ON/OFF control on a corresponding dot in accordance with the 1/0 value of the data $D_{mn}$ and outputs a binary data.

Numeral 105 denotes a multiplier which multiplies the binarization circuit 103 output $D_{mn}$ with a coefficient K and outputs the multiplication result to an error calculator 106. The coefficient K is determined from the number of bits of the digital RGB data inputted into the input unit 101 and the number of bits for level conversion on this RGB data. When eight-bit data from the input unit 101 is level-converted to one-bit data, the maximum density value becomes two-hundred and fifty-five level, accordingly, the coefficient K at the multiplier 105 is "255".

The error calculator 106 calculates the difference between the adder 102 output ($G_{mn}$) and the multiplier 105 output (K×$D_{mn}$) as a conversion error $E_n$. More specifically, the error calculator 106 obtains the error $E_n$ using an equation $En = K \times D_{mn} - G_{mn}$. The error calculator 106 outputs the obtained $E_n$ as a conversion error to an error diffusion unit 107. The error diffusion unit 107 performs diffusion with a predetermined weighting on the conversion error $E_n$ using a diffusion matrix 107a, and distributes the weighted errors to accumulation errors for respective pixels stored in a line buffer memory 108, more specifically, accumulation errors of pixels on a line currently being scanned (first line) or pixels on the next line (second line). The conversion error weighted in accordance with the diffusion matrix 107a is added to the accumulation errors already stored in pixel units, and the addition results are stored in the line buffer memory 108.

For example, when the line buffer memory 108 has accumulation errors of respective pixels ($X_{n-2} \sim X'_{n+2}$), and a conversion error $E_n$ is generated as a result from binarization at the position of $X_n$. In this case, the accumulation errors of the respective pixels are updated as follows:

$$X_{n+1} \leftarrow X_{n+1} + \tfrac{2}{8} \times E_n$$

$$X_{n+2} \leftarrow X_{n+2} + \tfrac{1}{8} \times E_n$$

$$X'_{n-2} \leftarrow X'_{n-2} + \tfrac{1}{8} \times E_n$$

$$X'_{n-1} \leftarrow X'_{n-1} + \tfrac{1}{8} \times E_n$$

$$X'_n \leftarrow X'_n + \tfrac{2}{8} \times E_n$$

$$X'_{n+1} \leftarrow X'_{n+1} + \tfrac{1}{8} \times E_n$$

The weighting on the error $E_n$ follows the diffusion matrix 107a. The new accumulation error $X_{n+1}$ is used in binarization of the next coordinates (m, n+1).

Numeral 109 denotes a frame buffer having a capacity for storing error data for at least one field in interlaced scanning. The frame buffer 109 enables error diffusion to a next line in interlaced scanning. Numeral 110 denotes a counter which counts the number of pixel data outputted from the input unit 101, and detects termination of binarization of one scanning line or termination of binarization of one field.

Figure 4:
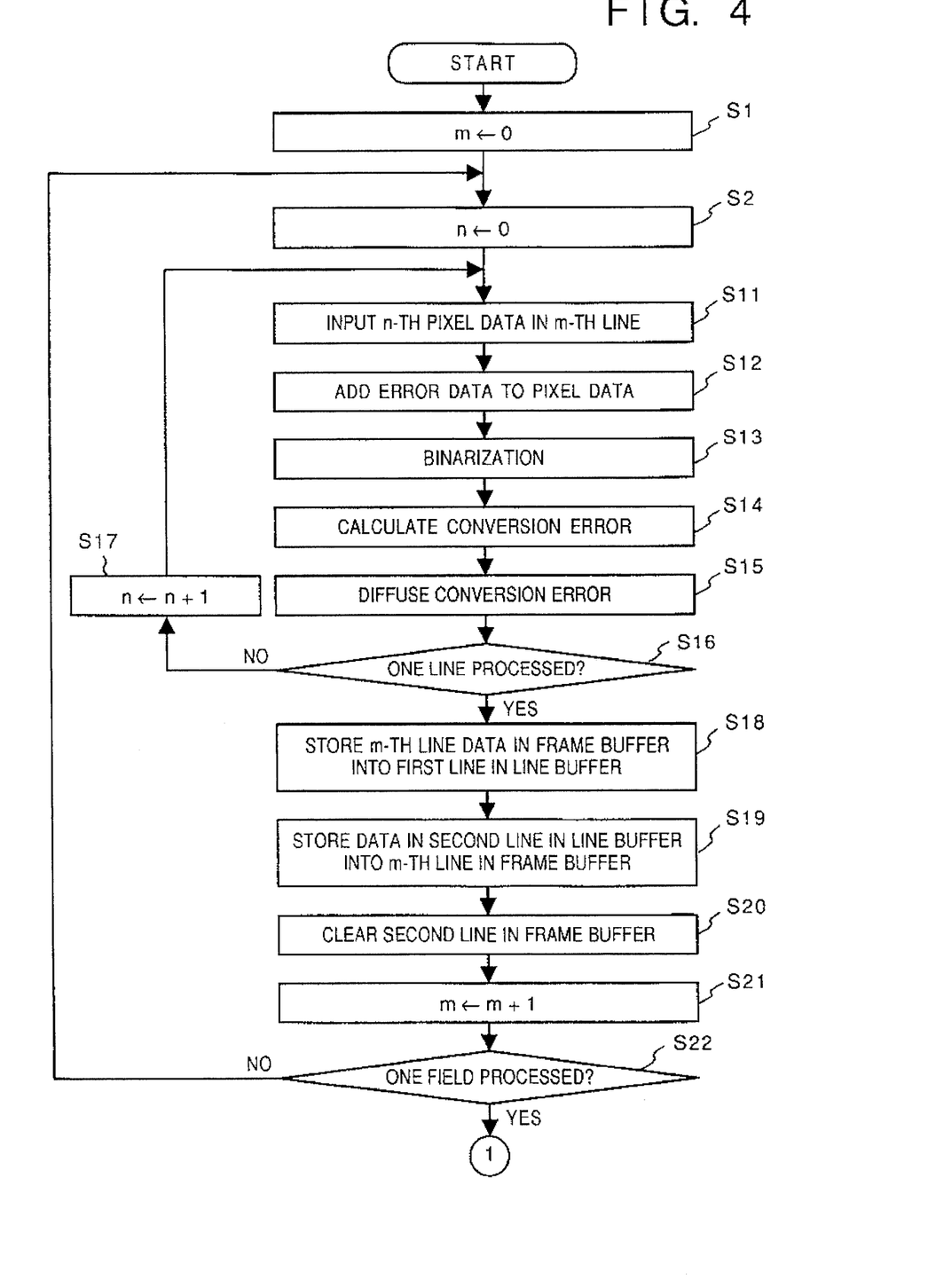
FIGS. 4 and 5 are flowcharts for explaining a level converting procedure according to the embodiment.

The operation of the level converter 34 having the above construction will be described with reference to the flowcharts in FIGS. 4 and 5. FIG. 4 shows the level conversion in a D1 field, and FIG. 5, in a D2 field.

In step S1, a count value m of the counter 110 which counts scanning lines of the level conversion is set to "0", and in step S2, a count value n indicative of the number of pixels in each scanning line is set to "0". In step S11, the input unit 101 outputs a pixel data $F_{mn}$, which indicates the n-th pixel in the m-th line, from digital RGB data. In step S12, the adder 102 adds the data $F_{mn}$ to the accumulation error $X_n$ to generate data $G_{mn}$. In step S13, the binarization circuit 103 compares the data $G_{mn}$ with a threshold level $V_{th}$ to perform binarization, and outputs binary data $D_{mn}$ to the output unit 104. In step S14, the error calculator 106 calculates a conversion error $E_n$ generated in the binarization in step S13, using the equation $K \times D_{mn} - G_{mn}$. In step S15, the error diffusion unit 107 performs weighting on the conversion error $E_n$ in accordance with the diffusion matrix 107a, and updates accumulation errors in the line buffer memory 108 using this error $E_n$.

In step S16, whether or not processing for one line of the original image has been finished is determined by comparing the count value n with the number of pixels for one line. If NO, the count value n is incremented by one in step S17. Then, the process returns to step S11 to repeat the above processing on the next pixel data. On the other hand, if YES, the process proceeds to step S18, in which data stored in the m-th line in the frame buffer 109 is stored into the first line in the line buffer 108. Then, in step S19, error data stored in the second line in the line buffer 108 is stored into the m-th line in the frame buffer 109. In step S20, the second line in the line buffer 108 is cleared, and in step S21, the counter 110 value m is incremented by one. Thereafter, the process proceeds to step S22.

In step S22, whether or not scanning for one field has been finished is determined. If YES, the process advances to step S101 in FIG. 5, to perform processing of the next field. If NO, the process returns to step S2, to perform processing on the next scanning line in the interlaced scanning. The determination as to whether or not processing for one field has been finished is made based on whether or not the counter 110 value m exceeds the number of scanning lines in one field.

Figure 5:
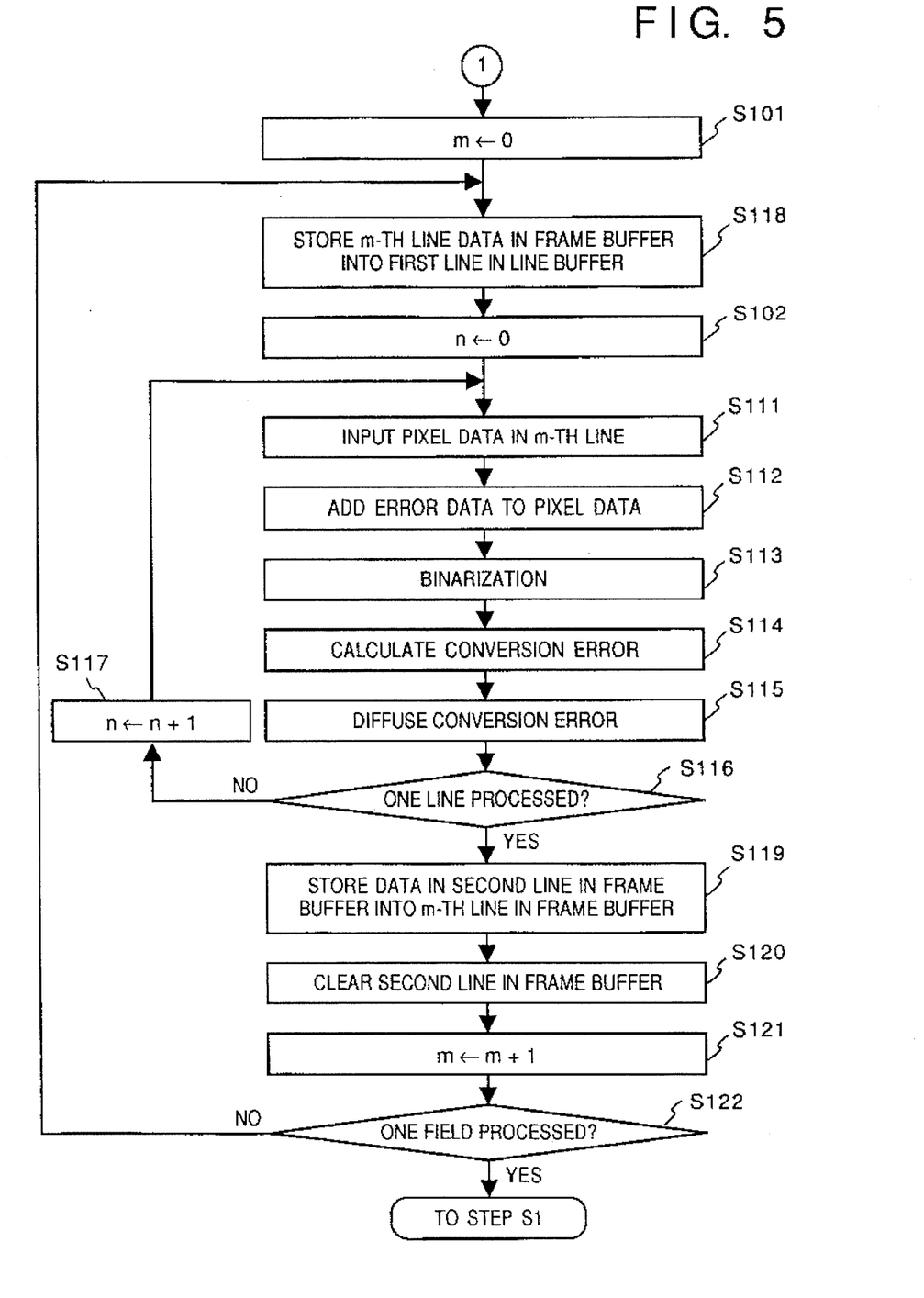

FIG. 5 shows the level conversion in a D2 field. In FIG. 5, steps S101, S102 and S111 to S122 respectively correspond to step S1, S2 and S11 to S22, therefore, the explanation of these steps will be omitted.

Figure 6:
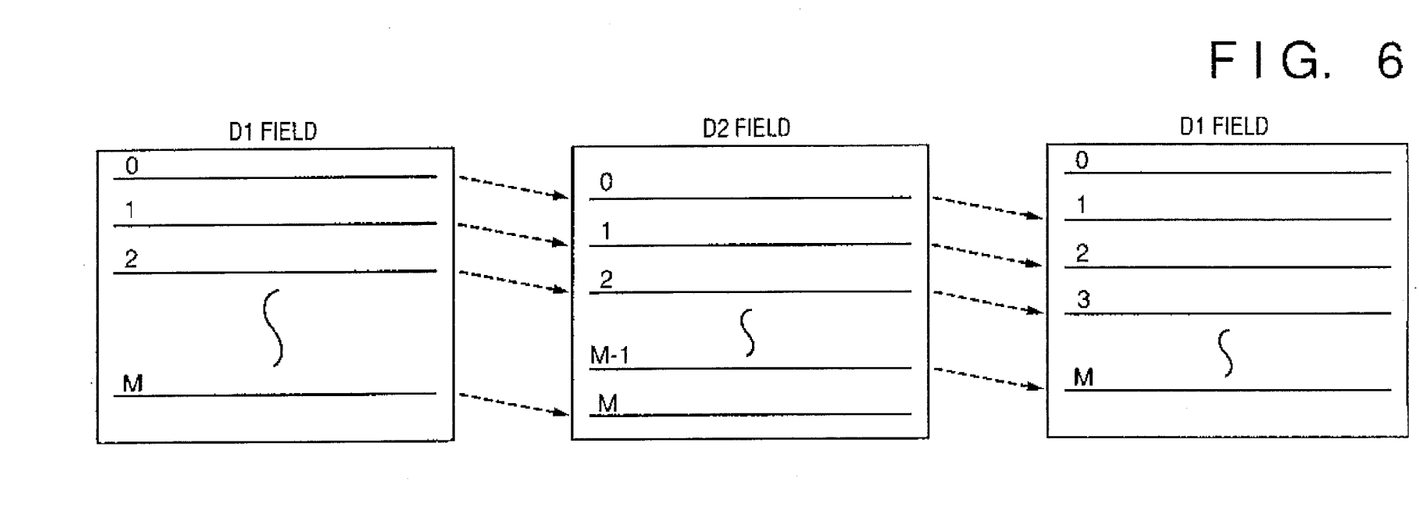
FIG. 6 illustrates error transmission among transmission fields.

In the level conversion in the D1 field shown in FIG. 4, upon processing the pixel data in the m-th line, the data stored the (m−1)th line in the frame buffer is referred to. On the other hand, according to the procedure shown in FIG. 5, the data in the m-th line in the frame buffer is first stored into the first line in the line buffer, and the pixel data in the m-th line is processed. That is, in the level conversion in the D2 field, the m-th line data in the frame buffer is referred to for level conversion of the pixel data in the m-th line. Thus, transmission of conversion error between the D1 and D2 fields is always directed to the next line of the opposite field, as shown in FIG. 6.

As described above, according to the image forming apparatus of the present embodiment, in level conversion of moving image data, upon transmitting conversion error to peripheral pixels of a pixel of interest, the conversion error is transmitted to the opposite field. This enables density-conserving level conversion on a moving image by interlaced-scanning.

The apparatus in the embodiment performs processing output from a binary output device, however, the present invention is applicable to a case of multi-level output device. Note that as described in the embodiment, the level conversion for binary output requires only one comparison, while level conversion for multi-level (n) output requires at least n−1 comparisons. Generally, the n-value level conversion uses the following table processing:

$D_{mn}$=tbl[input]

tbl: arrangement $D_{mn}$: multi-level conversion data input: input data

This table has one-dimensional arrangement in n-bit units. Each unit includes multi-level conversion data. That is, in the table, n-value multi-level conversion data corresponding to input data is prestored in an address indicated by the input data.

Further, the embodiment uses the diffusion matrix 107 having a 5×2 matrix size, however, this does not poses any limitation upon the present invention. Also, values of respective factors in the matrix are not limited to those in the embodiment. The pixel data before the level conversion has eight bits, however, this number of pixel bits is not limited to eight. Furthermore, the embodiment uses the masking based on the 3×3 first-order conversion, however, multiple-order conversion such as a second-order conversion or a third-order conversion is applicable.

Further, the level converter 34 may perform serial processing on respective color components of digital RGB data. Otherwise, a processor as shown in FIG. 3 may be provided for the respective color components and respective color data may be processed in a parallel manner.

As described above, the present invention enables level conversion for pseudo-halftone representation in image output by interlaced scanning.

The present invention can be applied to a system constituted by a plurality of devices, or to an apparatus comprising a single device. Furthermore, the invention is applicable also to a case where the object of the invention is attained by supplying a program to a system or apparatus.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:

input means for inputting image pixel data comprising a plurality of fields;

conversion means for converting the pixel data inputted by said input means to predetermined tone-level data based on (i) the pixel data and (ii) a diffusion error assigned to the pixel data, and for outputting the converted data;

diffusion means for diffusing an error generated in conversion by said conversion means, and for assigning the diffused errors as conversion errors to other pixel data;

storage means for storing conversion errors assigned to pixel data of a first field and other fields, said conversion errors being obtained by said diffusion means; and generation means for generating a diffusion error for the first field based on (i) the conversion errors obtained by said diffusion means and (ii) the conversion errors stored by said storage means, upon level conversion for the other fields.

2. The apparatus according to claim 1, wherein said diffusion means (i) has a memory for storing a conversion error for a predetermined number of lines, including lines of other fields, (ii) diffuses the error generated by said generation means to pixels on the predetermined number of lines, and stores the error-diffused pixel data into the memory.

3. The apparatus according to claim 1, wherein said input means inputs the pixel data using interlaced-scanning.

4. The apparatus according to claim 3, wherein said diffusion means comprises:

a line memory for storing conversion errors for two lines; and accumulation means for diffusing the conversion errors generated by said conversion means to (i) a first line of said line memory which includes the pixel data and (ii) a subsequent second line of said line memory, and for accumulating the errors as conversion errors for respective pixels into said line memory, and wherein said storage means stores the conversion errors diffused to the second line.

5. The apparatus according to claim 3, wherein said diffusion means comprises:

a line memory for storing a conversion error for two lines of an image;

accumulation means for diffusing the errors generated by said conversion means to (i) a first line of said line memory which includes the pixel data and (ii) a subsequent second line of said line memory, and for accumulating the errors, as conversion error for respective pixels, into the first and second lines in said line memory; and updating means for updating said line memory by, prior to input of pixel data for one line, reading a conversion error corresponding to the line out of conversion errors stored by said storage means and storing the conversion error into the first line in said line memory.

6. The apparatus according to claim 5, wherein said storage means has a frame memory for storing conversion errors corresponding to pixels in at least one field.

7. The apparatus according to claim 6, wherein, prior to input of pixel data for one line, Said updating means reads conversion errors corresponding to the line from said frame memory, and stores the conversion error into the first line in said line memory, and wherein said storage means stores conversion errors stored in the second line in said line memory into a storage position in said frame memory.

8. The apparatus according to claim 1, wherein said conversion means adds a diffusion error assigned to the pixel data inputted by said input means to the pixel data, compares the pixel data with a predetermined value, and outputs the pixel data as binary data based on a comparison result.

9. The apparatus according to claim 1, wherein said conversion means (i) has a table in which a value obtained from conversion is stored in a memory address which corresponds to a value prior to the conversion, and (ii) performs level conversion on the pixel data inputted by said input means by reading the value obtained from the conversion out of said table in accordance with an address based on the result of addition of the input pixel data and the diffusion error assigned to the pixel data.

10. An image processing method comprising:

an input step of inputting image pixel data comprising a plurality of fields;

a conversion step of converting the pixel data inputted in said input step to predetermined tone-level data based on (i) the pixel data and (ii) a diffusion error assigned to the pixel data, and for outputting the converted data;

a diffusion step (i) diffusing an error generated in conversion in said conversion step and (ii) assigning the diffused errors as conversion errors to other pixel data;

a storage step of storing conversion errors assigned to pixel data of a first field and other fields, said conversion errors being obtained in said diffusion step; and a generation step of generating a diffusion error for the first field based on (i) the conversion errors obtained in said diffusion step and (ii) the conversion errors stored in said storage step, upon level conversion for the other fields.

11. The method according to claim 10, wherein in said diffusion step, a memory for storing a conversion error for a predetermined number of lines is used, the error generated in said generation means are diffused to pixels on the predetermined number of lines, and the error-diffused pixel data are stored in the memory.

12. The method according to claim 10, wherein the pixel data is inputted with interlaced-scanning in said input step.

13. The method according to claim 12, wherein in said diffusion step, a line memory for storing conversion errors for two lines is used, and said diffusion step comprises an accumulation step of diffusing the conversion errors generated in said conversion step to a first line of said line memory including the pixel data and a subsequent second line of said line memory, and accumulating the errors as conversion errors for respective pixels into said line memory, and wherein the conversion errors diffused to the second line are stored in said storage step.

14. The method according to claim 12, wherein in said diffusion step, a line memory for storing conversion errors for two lines of an image is used, and said diffusion step comprises;

an accumulation step of diffusing the error generated in said conversion step to a first line of said line memory including the pixel data and a subsequent second line, of said line memory and accumulating the errors, as conversion error for respective pixels, into the first and second lines in said line memory; and an updating step of updating said line memory by, prior to input of pixel data for one line, reading a conversion error corresponding to the line out of conversion errors stored in said storage step and storing the conversion error into the first line in said line memory.

15. The method according to claim 12, wherein a frame memory for storing a conversion error corresponding to pixels in at least one field is used in said storage step.

16. The method according to claim 15, wherein in said updating step, prior to input of pixel data for one line, conversion errors corresponding to the line are read from said frame memory, and the conversion errors are stored into the first line in said line memory, and wherein in said storage step, conversion errors stored in the second line in said line memory are stored into a storage position in said frame memory.

17. The method according to claim 10, wherein in said conversion step, a diffusion error assigned to the pixel data inputted in said input means is added to the pixel data, the pixel data is compared with a predetermined value, and the pixel data is outputted as binary data based on a comparison result.

18. The method according to claim 10, wherein in said conversion step, a table in which a value obtained from conversion is stored in a memory address which corresponds to a value prior to the conversion is used, and level conversion is performed on the pixel data inputted in said input means, by reading the value obtained from the conversion out of said table in accordance with an address based on the result from addition of the input pixel data and the diffusion error assigned to the pixel data.

* * * * *

UNITED STATES PATENT AND TRADEMARK OFFICE
CERTIFICATE OF CORRECTION

PATENT NO. : 5,543,855
DATED : August 6, 1996
INVENTOR(S) : OSAMU YAMADA, ET AL.

It is certified that error appears in the above-indentified patent and that said Letters Patent is hereby corrected as shown below:

Title page, item[56]
    line 1, "5,130,819 6/1992 Ohta" should read --5,130,819 7/1992 Ohta--.

Column 2,
    line 13, "filed." should read --field.--.

Column 3,
    line 41, "with" should read --which--.

Column 6,
    line 2, "poses" should read --pose--.

Column 7,
    line 23, "Said" should read --said--.

Column 8,
    line 25, "line," should read --line--; and
    line 26, "memory" should read --memory,--.

Signed and Sealed this

Fourteenth Day of January, 1997

Attest:

BRUCE LEHMAN

*Attesting Officer*      *Commissioner of Patents and Trademarks*